(12) United States Patent
Kobayashi

(10) Patent No.: US 7,222,186 B2
(45) Date of Patent: May 22, 2007

(54) CONTENT TRANSFERRING TECHNIQUE

(75) Inventor: Masayoshi Kobayashi, Tokyo (JP)

(73) Assignee: NEC Corporation (JP)

( * ) Notice: Subject to any disclaimer, the term of this patent is extended or adjusted under 35 U.S.C. 154(b) by 558 days.

(21) Appl. No.: 09/915,058

(22) Filed: Jul. 24, 2001

(65) Prior Publication Data

US 2002/0065933 A1  May 30, 2002

(30) Foreign Application Priority Data

Jul. 25, 2000  (JP) .............................. 2000-224447

(51) Int. Cl.
*G06F 15/16* (2006.01)
*G06F 15/173* (2006.01)
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ...................... 709/235; 709/217; 709/232; 709/238; 370/237

(58) Field of Classification Search ................ 709/234, 709/238, 239, 240, 241, 242, 224; 370/237
See application file for complete search history.

(56) References Cited

U.S. PATENT DOCUMENTS

| | | | | |
|---|---|---|---|---|
| 4,049,917 A | | 9/1977 | Copperi et al. | |
| 5,745,758 A | * | 4/1998 | Shaw et al. | 709/242 |
| 6,006,260 A | * | 12/1999 | Barrick et al. | 709/224 |
| 6,067,565 A | * | 5/2000 | Horvitz | 709/234 |
| 6,078,956 A | * | 6/2000 | Bryant et al. | 709/224 |
| 6,130,881 A | * | 10/2000 | Stiller et al. | 370/238 |
| 6,167,438 A | * | 12/2000 | Yates et al. | 709/216 |
| 6,182,111 B1 | * | 1/2001 | Inohara et al. | 709/217 |
| 6,256,675 B1 | * | 7/2001 | Rabinovich | 709/241 |
| 6,317,775 B1 | * | 11/2001 | Coile et al. | 709/201 |
| 6,546,422 B1 | * | 4/2003 | Isoyama et al. | 709/238 |
| 6,820,133 B1 | * | 11/2004 | Grove et al. | 709/238 |
| 6,850,980 B1 | * | 2/2005 | Gourlay | 709/238 |

FOREIGN PATENT DOCUMENTS

| | | |
|---|---|---|
| JP | 61-248640 | 11/1986 |
| JP | 7-307760 | 11/1995 |
| JP | 2001-526814 | 12/2001 |

OTHER PUBLICATIONS

Japanese Office Action issued Jan. 5, 2005 (w/ English translation of relevant portions).

(Continued)

*Primary Examiner*—Krisna Lim
*Assistant Examiner*—Hassan Phillips
(74) *Attorney, Agent, or Firm*—Dickstein, Shapiro, LLP.

(57) ABSTRACT

A content transfer method allowing the transfer of content requiring no urgency to reduce influence on other traffics is disclosed. A relay server is used to transfer the content from a content server to a cache server. The content is transferred while temporarily storing each relay server in each of sections obtained by the relay server dividing the path from the content server to the cache server. Further, since relay servers perform relay operation during time slots determined for respective ones of the relay servers, the influence on other traffics can be more reduced.

13 Claims, 10 Drawing Sheets

OTHER PUBLICATIONS

Hisashi Kojima, et al., "Characteristics of Buffer-Equipped Multicast Distribution System," Technical Research Report Sse 98-51-60, Electronic Information and Communications Society, Aug. 20, 1998, pp. 49-54.

Japanese Office Action issued Sep. 28, 2004 (w/ English translation of relevant portions).

Official Publication of Toku Hyo 2001-526814, Technical Research Report MVE 2000-8, Society of Electronic Information and Communications Science, Apr. 21, 2000.

Official Publication of Toku Kai Sho 61-248640, Technical Research Report CS 2000-41, Society of Electronic Information and Communications Science, Sep. 21, 2000.

Technical Research Report IN 2000-150, Society of Electronic Information and Communications Science, Nov. 22, 2000.

Japanese Office Action issued Sep. 28, 2004 (w/ English translation of relevant portions).

Kenichi Chinen, et al., "Designing and Installation of an Interacive Pre-reading System in WWW," Vo. 15, No. 2. Society of Software Science of Japan, pp. 48-61, Mar. 16, 1998.

Official Publication of Toku Hyo 2001-526814, Technical Research Report MVE 2000-8, Society of Electronic Information and Communications Science, Apr. 21, 2000.

Official Publication of Toku Kai Sho 61-248640, Technical Research Report CS 2000-41, Society of Electronic Information and Communications Science, Sep. 21, 2000.

Technical Research Report IN 2000-150, Society of Electronic Information and Communications Science, Nov. 22, 2000.

* cited by examiner

FIG.7

| ROUTER ADDRESS | LINK | NEXT HOP ROUTER ADDRESS | CONNECTING DEVICE ADDRESS |
|---|---|---|---|
| R1 | L1 | R2 | |
| R1 | L6 | R7 | |
| ⋮ | ⋮ | ⋮ | ⋮ |
| R1 | | | S1 |
| R2 | L1 | R1 | |
| R2 | L2 | R3 | |
| ⋮ | ⋮ | ⋮ | ⋮ |
| R2 | | | T2, C2 |
| R3 | L2 | R2 | |
| ⋮ | ⋮ | ⋮ | ⋮ |

CONTENT TRANSFERRING TECHNIQUE

BACKGROUND OF THE INVENTION

1. Field of the Invention

The present invention relates to a technique for transferring information which is not urgent and prefetched or preloaded by a cache server, and in particular to a content transferring technique allowing the reduction of influence on other traffics at the same or transferring the content.

2. Description of the Related Art

In the case of transferring contents through a network, some contents require urgency, and while some not it. Contents prefetched by a cache server which is disposed on the network to shorten the access time to the contents by a terminal are a typical example of the contents having no requirement of urgency.

As shown in FIG. 11, it is assumed for simplicity that a network system is composed of Web servers S100, S101, cache servers C100, C101, terminals T1, T2, and routers R1–R7 which are connected by links L1–L8.

When a terminal (for example, T1) obtains content in a Web server (for example, S100), certain cache server (for example, C100) intermediates between the terminal and the Web server. When having received an access request for certain content in the Web server S100 from the terminal T1, the cache server C100 checks whether the requested content is held in its own memory.

In the case where the cache server C100 does not store the content, it inquires the above-described content from other cache servers. If a cache server stores the content, the cache server C100 obtains it from the cache server, and thereafter transmits it to the terminal T1 that is a content-request source. If no cache server stores the content, the cache server C100 obtains it from the originally storing Web server (original Web server) S100, and thereafter transmits it to the terminal T1 that is a content-request source. At this time, the obtained content may be simultaneously stored into the storage of the cache server C100.

Contrarily, when the cache server C100 stores the content, the cache server C100 transmits the stored content to the terminal T1. At this time, the cache server C100 inquires the last updating date and time of the content from the original Web server S100, and when the date and time of the stored content is older than that of the content stored in the original Web server S100, the cache server C100 may obtain the fresh content from the original Web server S100 again, which is called an update checking operation.

A cache server (here, C100, C101) may be asked by not only terminals but other cache servers, whether the content is stored. When the cache server is asked by another cache server, the cache server performs the same operation as in the case where the cache server intermediates between the Web server and the terminal.

Each of the cache servers carries out the above operation. If the update checking operation is not carried out, then the cache server may store the content older than that stored in the Web server (that is, the content of the cache server does not reflect the updating of the content carried out at the Web server), even when the cache server is holding the content for an access request. In this case, the old content is sent to the terminal. When the cache server is holding the old content at the time of carrying out the update checking, it takes time for the terminal to obtain the updated content, because the cache server obtains the updated content from the original Web server again.

For the above reason, it is important for each cache server to hold Web content which has a high probability of receiving an access request from the terminals and is not older than that on the Web server.

In order to meet this requirement, each cache server has carried out: 1) an automatic cache updating operation; 2) a link prefetching operation; and 3) a cache server cooperating operation.

The automatic cache updating operation is the operation of obtaining the latest version of the Web content held by the cache server from the original Web server by making access to this original Web server.

The link prefetching operation is the operation of previously obtaining the content information associated with links described in the Web content that is held by the cache server.

The cache server cooperating operation is the operation of carrying out redistribution, sharing and comparison of freshness of caches held by cache servers, among the cache servers. The cache redistribution is the operation that a cache server that does not have a certain content obtains the content from another cache server that has the content. The cache sharing is the operation that when a cache server that does not have a certain content has received a request for making access to the content from a terminal, this cache server transfers this access request to a cache server that has the content. The cache freshness comparison is the operation that a cache server that has a certain content checks whether another cache server has the latest version of the content that reflect the latest updating by the Web server, and obtains the latest version when necessary.

For the cache server cooperating operation, a conventional cache server has exchanged with each other a list of contents held by respective cache servers and information showing cache validity of contents held by each of the cache servers (called content summary). As the information showing the validity of a cache, an effective period of the cache indicated by the content-originating server, and the last updating time and date of the content have been used.

The acquisition of content or content summary caused by the above described automatic cache updating, the link prefetching and the cache server cooperating operations, are performed through a network, which will be described hereafter.

For example, when the cache server C100 obtains certain content from the Web server S100 in the automatic cache updating operation or the link prefetching operation, the cache server C100 transmits to a network an access request for the above described certain content addressed to Web server S100. This access request is transmitted to Web server S100 through a path determined by the content of the routing table in each router, for example, R6→L5→R5→L4→R4→L3→R3→L2→R2→L1→R1.

The Web server S100 having received the access request transfers the requested content to the cache server C100.

Further, for example, in the case where the cache server C100 obtains content or content summary from the cache server C101, the cache server C100 transmits to a network an access request for the above-described certain content addressed to cache server C101. This access request is transmitted to cache server C101 through a path determined by the content of routing table: R6→L5→R5→L4→R4→L3→R3→L2→R2. The cache server C101 transfers the content or content summary required by the access request to the cache server C100.

Basically, the automatic cache updating operation, the link prefetching operation, and the cache server cooperating operation are performed to predict the Web content that may be required by a terminal and to make access to the Web server prior to the time when the terminal actually requires the content. Accordingly, these operations are not urgent and it is preferable for these operations having no urgency not to interrupt other traffics that are generated based on the actual needs of the Web servers by terminals.

However, the above-described conventional technique has such a disadvantage that the transfer of content caused by the link prefetching operation and the like simultaneously occupies a certain bandwidth in the entire path from the Web server or cache server storing the content to the cache server requesting for the content. Accordingly, the link prefetching operation and the like easily affect other traffics. Particularly, when the number of hops between a content-request source and a content request destination is large, the total bandwidth occupied in the entire path becomes large, resulting in a substantial amount of influence on other traffics in the network.

SUMMARY OF THE INVENTION

An object of the present invention is to provide a content transfer method and system allowing the transfer of content requiring no urgency to reduce influence on other traffics.

According to the present invention, in the case of transferring information that is not urgent from a server originally holding the information to an information-request source through a network including a plurality of routers, a method comprises the steps of: determining at least one relay server located on a path between the server and the information-request source, wherein the path is set by at least one router in the network; and transferring the information through the path such that each relay server receives the information from upstream, temporarily stores and transmits the same to downstream.

The information-request source may be a cache server for storing a copy of information that is likely to be accessed by a terminal. Transfer of information from the server to the cache server is caused by the cache server performing at least one of an automatic cache updating operation, a link prefetching operation and a cache server cooperating operation.

According to another aspect of the present invention, in the case of transferring information that is likely to be accessed by a terminal from a server originally holding the information to a cache server through a network including a plurality of relay servers, wherein the information is stored in the cache server, a method comprises the steps of: providing a plurality of relay servers each having a time slot previously assigned thereto; determining at least one relay server located on a path between the server and the cache server, wherein the path is set by at least one router in the network. Each relay server, when a current time falls into the time slot assigned thereto, sends a request for transfer of the information to an upstream-located server holding the information when receiving the information from the upstream-located server through the path in response to the request, stores the information; and when receiving a request for transfer of the information from a downstream-located server, transmits the information stored to the downstream located server through the path.

The time slot assigned to each relay server may be determining depending on where the relay server is installed, wherein the time slot is a time period during which small traffic is predicted in an area where the relay server is installed.

A network system according to the present invention includes: a content-request source for requesting content that is not urgent; a server storing the content; at least one relay server for relaying the content; and a plurality of routers. The content-request source includes: a relay controller for notifying a relay server located on a path set by at least one router between the server and the content-request source, of identification of the content to be obtained. The at least one relay server includes: a storage for storing the content; and a controller controlling such that the content is received from upstream, is temporarily stored in the storage, and is transmitted to downstream.

A network system according to the present invention includes: a cache server for requesting content that is likely to be accessed by a terminal; a server storing the content; a plurality of relay servers, each of which relays the content; and a plurality of routers. The cache server comprises: a relay timing memory for storing a time slot suitable for relay operation for each of the relay servers; and a relay controller for notifying a relay server located on a path set by at least one router between the server and the cache server, of identification of the content to be obtained, in the time slot for the relay server. Each of the relay servers comprises: a storage for storing the content; and a controller controlling such that when receiving the identification of the content to be obtained from the cache server, a request for transfer of the content is sent to an upstream-located server holding the content, when receiving the content from the upstream-located server through the path in response to the request, the content is stored in the storage, and when receiving a request for transfer of the content from a downstream-located server, the content stored is transmitted to the downstream-located server through the path.

As described above, according to the present invention, at least one relay server is used to transfer the content that is not urgent from a content storing server to a content request source. Accordingly, it is possible to transfer the content for each of sections obtained by at least one relay server dividing the path from the content storing server to the content-request source. Compared with the prior art such that the transfer of content simultaneously occupies a certain bandwidth in the entire path, the network resource consumption at one time becomes small, resulting in reduced influence on other traffics.

Further, since relay servers perform the relay operation during the time slots determined for respective ones of the relay servers, the influence on other traffics can be reduced furthermore.

BRIEF DESCRIPTION OF THE DRAWINGS

FIG. 7 is a diagram showing an example of path information stored in a path information memory;

DESCRIPTION OF THE PREFERRED EMBODIMENTS

First Embodiment

Figure 1:
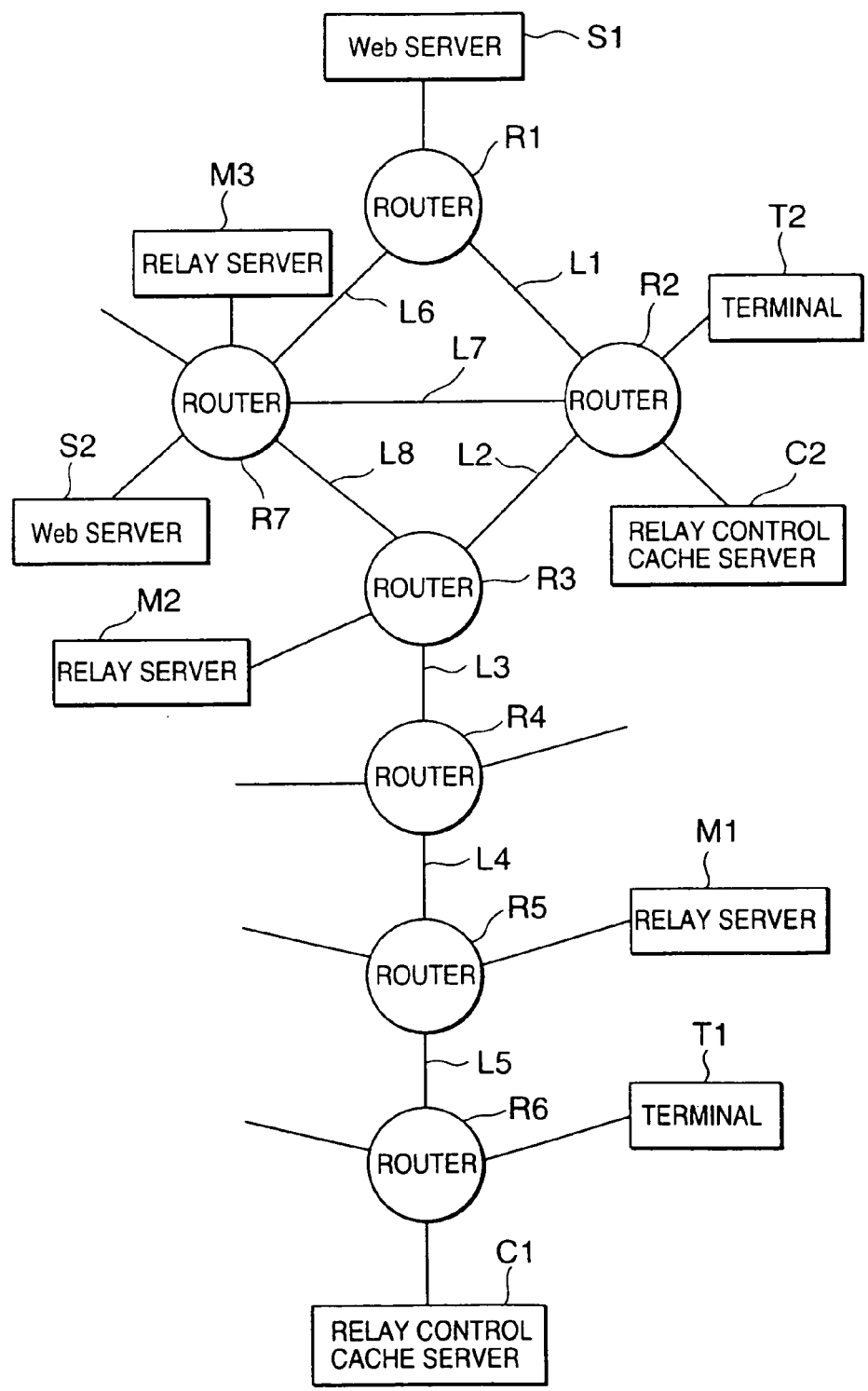
FIG. 1 is a diagram showing a part of a network system according to a first embodiment of the present invention.

As shown in FIG. 1, it is assumed that a network system according to a first embodiment of the present invention is composed of Web servers S1, S2, relay control cache servers C1, C2, relay servers M1–M3, terminals T1, T2, and router R1–R7 which are connected by links L1–L8.

It is effective for a relay server to be arranged adjacent to a router having a large number of links connecting with other routers (for example, the router R3 having 3 links in FIG. 1). Because there is a high probability that such a relay server is located on the path to transfer contents and the contents can be relayed without extensive change in the path, compared with the case of no relay, resulting in reduced resource consumption in the network. In other words, the path determined by the content of a routing table used in the case of no relay, is usually a path which has the smallest number of hops and allows the smallest resource consumption, and further the path with no extensive path change can also reduce network resource consumption.

Further, it is effective for a relay server to be arranged adjacent to a link having a wide bandwidth. In the case where the relay server is arranged adjacent to a certain router, the traffic through the router is increased and, if the bandwidth of the link connected to the relay server is narrow, then the link bandwidth possibly runs out. Accordingly, a wide-bandwidth link connected to the router associated with the relay server can reduce a possibility of running out of the link bandwidth.

The Web serves S1, S2 store various contents. The terminals T1, T2 access the Web server S1, S2. The relay control cache server C1, C2 store copies of contents stored in Web servers S1, S2, which the terminals T1, T2 or other cache servers including a relay control cache server or conventional cache server (not shown) have accessed to. When the relay server M1, M2, or M3 has received an instruction from a content-request source (here, the relay control cache server C1, C2) to obtain designed content from a designated location, the relay server obtains the designated content from the designated location and thereafter temporarily stores them. Also, each of the routers R1–R7 performs routing process based on the content of its own routing table.

When a terminal (for example, T1) obtains content stored in Web server (for example, S1), a certain relay control cache server (for example, C1) intermediates between the terminal and the Web server. When receiving a request for access to the content from the terminal T1, the relay control cache server C1 checks whether the content has been already stored therein.

In the case where the relay control cache server C1 does not hold the content, the relay control cache server C1 inquires about whether other cache servers hold the requested content. In this way, the relay control cache server C1 obtains the content from a cache server having the content or the original Web server S1 originally storing the content and then transfers the content to the terminal T1.

In the case where the relay control cache server C1 stores the content, the content is transferred directly to the terminal T1. At this time, the relay control cache server C1 inquires the last updating date and time of the content from the original Web server S1. If the last updating date and time of the content stored in the relay control cache server C1 is older than that of the content stored in the original Web server, then the relay control cache server C1 obtains the content from the original Web server S1 again (the updating check operation).

A cache server (here, C1, C2) may be asked whether the content is stored, from not only terminals but other cache servers. When the cache server is asked by another cache server, the cache server performs the same operation as in the case where the cache server intermediates between the Web server and the terminal.

Similarly to the above-described conventional cache server, the relay control cache server (C1, C2 or the like) performs 1) the automatic cache updating operation, 2) the link prefetching operation, and 3) the cache server cooperating operation in order to improve its effectiveness. However, as described before, the transfer of content caused by the link prefetching operation and the like simultaneously occupies a certain bandwidth in the entire path (determined by the content of routing table) from the Web server or cache server storing the content to the cache server requesting for the content to transfer the content.

In contrast, according to the present embodiment, one or more relay server located on the path is used to divide the path into a plurality of sections, which are sequentially used from upstream to transfer the content.

Figure 2:
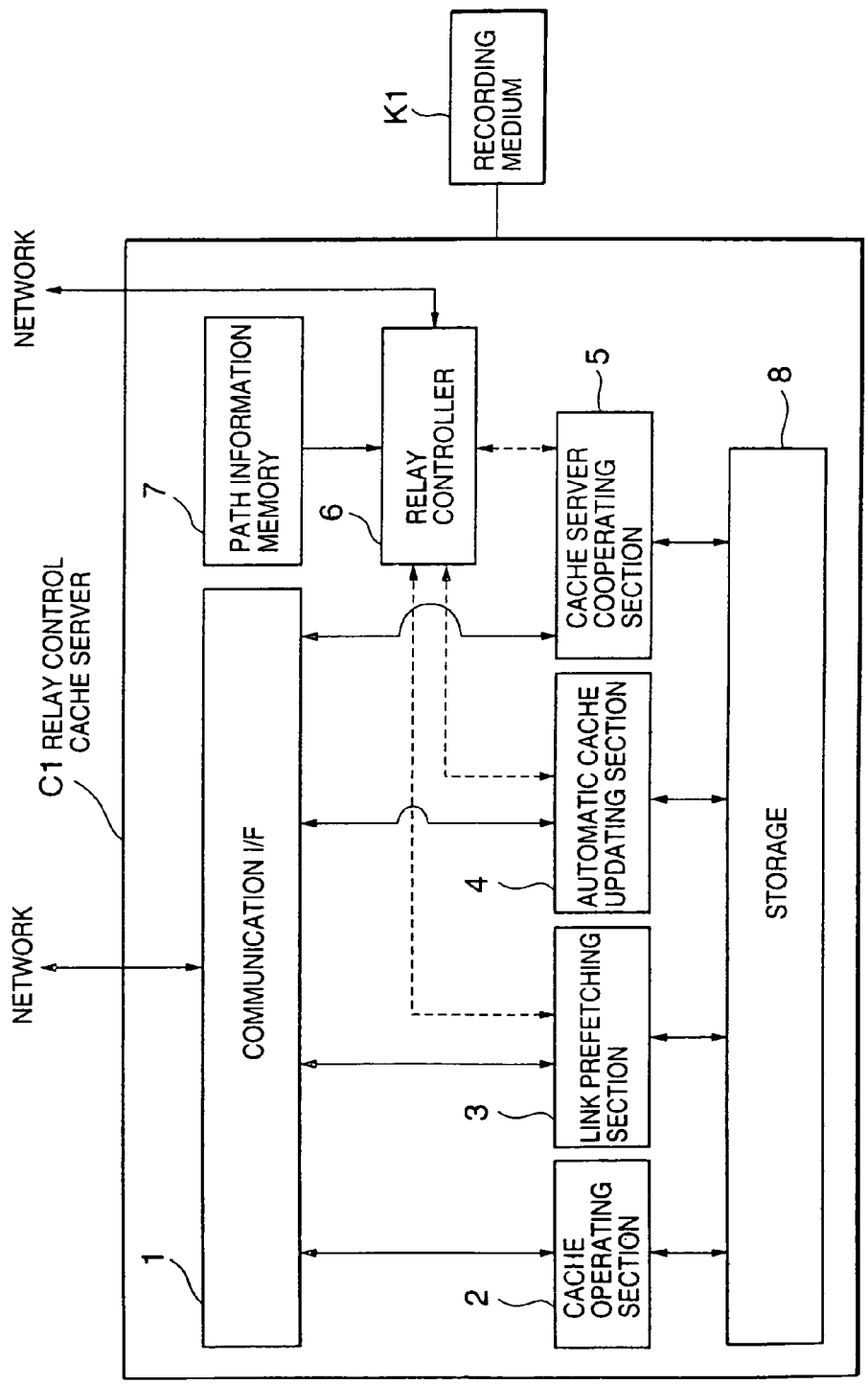
FIG. 2 is a block diagram showing an internal circuit of a relay control cache server in the first embodiment.

FIG. 2 is a block diagram showing an example of an internal structure of the relay control cache server C1 as shown in FIG. 1. Each element will be described hereafter. The other relay control cache server C2 also has a similar circuit.

A communication interface section 1 provides a transmission/reception interface between a network and each of a cache operating section 2, a link prefetching control section 3, an automatic cache updating section 4, and a cache server cooperating section 5.

The cache operating section 2 receives a request for making access to a Web content from a terminal via the communication interface section 1, and searches a storage 8 for the desired content. When the desired content is not found in the storage 106, the cache operating section 2 makes access to the corresponding Web server or other cache servers to obtain the desired content and stores the obtained content in the storage 8, and at the same time, transmits the obtained content to the content-request source. When the content is found in the storage 8, the cache operating section 2 transmits the content to the terminal. In the case of carrying out the update checking operation when the content is found, the cache operating section 2 checks whether the last update date and time of the stored content is older than the last update date and time of the content held by the Web server. When the last update date and time of the stored content is older, the cache operating section 2 obtains the content from the Web server, stores the obtained content in the storage 8, and at the same time, passes the obtained content to the terminal.

The link prefetching control section 3 finds links to content information which are now not stored in the storage 8 but have a possibility of making access thereto from now on, from the links to relevant information described in the Web content stored in the storage 8. For example, among a first predetermined number of links described in the content, links to contents which do not exist in the storage 8 are selected as links having a possibility of making access thereto from now on. The found links are transferred to a relay controller 6. The contents received under control of the relay controller 6 are stored in the storage 8.

The automatic cache updating section 4 investigates the intervals of updating of the content on the Web server originally holding the content, for the Web content held within the storage 8. Then, the automatic cache updating section 4 determines the date and time of updating the cache content. On the determined date and time, the automatic cache updating section 4 passes the location information (network address) of the Web server holding the content and the content identification (ID) to the relay controller 6. The contents received under control of the relay controller 6 are stored in the storage 8.

The cache server cooperating section 5 exchanges with each other lists of contents held by the respective cache servers and information (content summary) showing the validity of the cache of content held by each cache server, for carrying out redistribution, sharing and comparison of freshness among the cache servers. Based on such information, the cache server cooperating section 5 performs content exchanging as necessary. In the case where the content or content summary is obtained, the cache server cooperating section 5 passes the location information (network address) of the Web server holding the content and the content identification (ID) to the relay controller 6. The contents received under control of the relay controller 6 are stored in the storage 8.

A path information memory 7 stores path information representing the configuration of the network.

The relay controller 6 receives information for specifying Web content or content summary to be obtained (network address and ID), from the link prefetching control section 3, the automatic cache updating section 4, and the cache server cooperating section 5. The relay controller 6 determines which one of relay servers the Web content or content summary is obtained through, based on the network address and ID as well as the path information stored in the path information memory 7. Then, the relay controller 6 issues the relay instruction to all the relay servers that carry out the relay of the Web content or content summary. Then, the relay controller 6 obtains the web content or content summary actually through these instructed relay servers.

The storage 8 stores various contents and content summaries.

The relay control cache server C1 is implemented by a computer. A recording medium K1 like a disk or a semiconductor memory stores a program for making the computer function as the relay control cache server. This program runs on the computer to control the operation of the computer, and thereby the communication interface section 1, the cache operating section 2, the link prefetching control section 3, the automatic cache updating section 4, the cache server cooperating section 5, and the relay controller 6 are realized on the computer.

Figure 3:
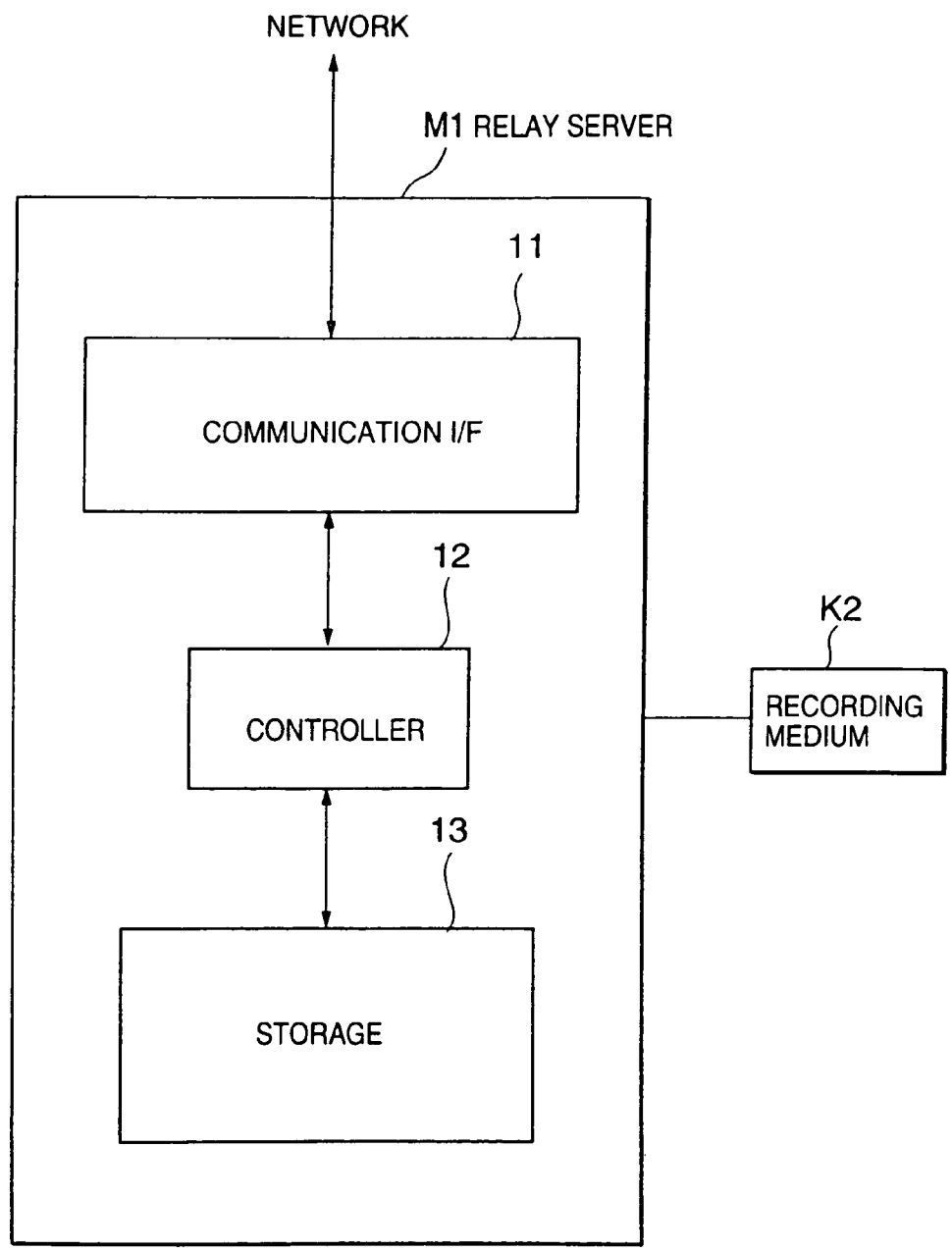
FIG. 3 is a block diagram showing an internal circuit of a relay server in the first embodiment.

Referring to FIG. 3, a relay server M1 is provided with a communication interface section 11, a controller 12, and a storage 13. Each component will be described below. The other relay server M2, M3 also have the similar configuration to that of relay server M1.

The communication interface section 11 provides an interface to the network to allow transmission and reception of data between the network and the controller 12.

The storage 13 temporarily stores various contents and content summaries.

The controller 12 controls such that, when the content or content summary to be obtained and the content providing server (Web server, relay control cache server, or relay server) are designated by the relay control cache server, the controller 12 requests the content providing server to transfer the above-described content or content summary. When content or content summary has been received in response to this request, the controller 12 stores the received content or content summary in the storage 13. In the case where a request for the transfer of content or the like has been received from the relay control cache server or the relay server, the controller 12 reads out the requested content or the like from the storage 13 and transfers it to the content-request source.

A recording medium K2 like a disk or a semiconductor memory stores a program for making the computer function as the relay server. This program runs on the computer to control the operation of the computer, and thereby the communication interface section 11 and the controller 2 are realized on the computer.

Operation

Operations of the first embodiment will be described in detail with reference to FIGS. 4–6.

Figure 4:
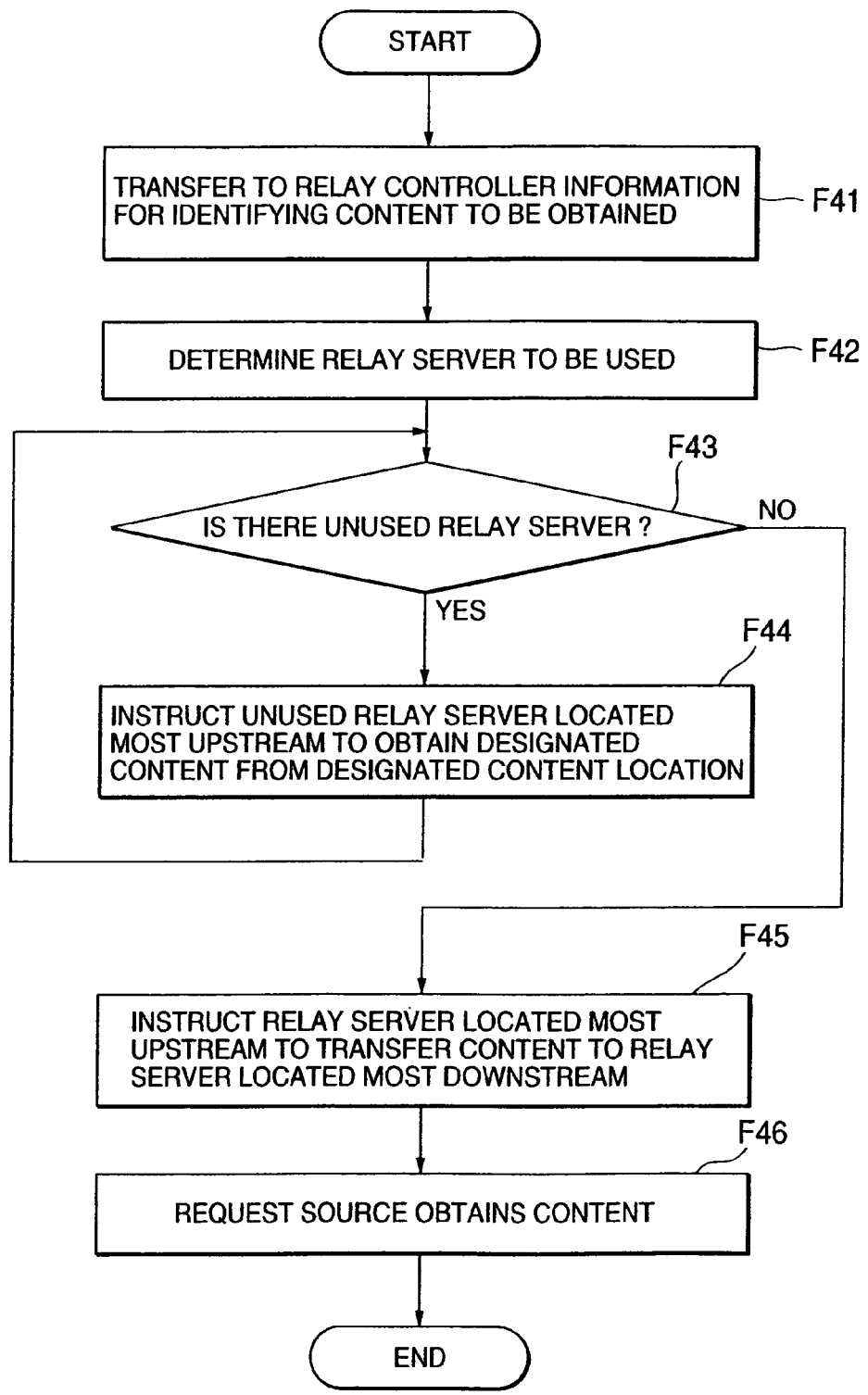
FIG. 4 is a flow chart showing a control operation of the relay control cache server of the first embodiment.

When the link prefetching control section 3, the automatic cache updating section 4 or the cache server cooperating section 5 in the relay control cache server C1, C2, obtains content or content summary, the link prefetching control section 3, the automatic cache updating section 4 or the cache server cooperating section 5 transfers information for specifying the obtained content or content summary to the relay controller 6 (step F41 or FIG. 4). This information includes the network address of a server storing the content or content summary and the ID identifying the content or content summary.

As an example of the step F41, it is assumed that the automatic cache updating section 4 in the relay control cache server C1 transfers the network address of Web server S1 and the ID of content α to the relay controller 6 to obtain contents α stored in Web server S1. In this case, the relay controller 6 determines the relay server used for transfer of the contents α based on the network address of Web server S1 passed from automatic cache updating section 4, network addresses of respective ones of the previously recognized relay servers M1–M3, and the path information stored in the path information memory 7 (step F42).

The path information memory 7 stores the path information as shown in FIG. 7. In the fields of the path information table, "router address" shows the network address of router, "link" shows the link to next hop router, "next hop router address" shows the network address of next hop router, and "connecting device address" shows the network address of a device connected to router, such as terminal, Web server, relay control cache server, relay server, and the like.

In step F42, all of relay servers involved in the path which is determined by the content of routing table in each router between the relay control cache server C1 originating the request and the Web server S1 storing the contents α are used for the transfer of the content α. For example, when the path between the relay control cache server C1 and the Web server S1 is assumed as: C1→R6→L5→R5→L4→R4→L3→R3→L2→R2→L1→R1→S1, the relay controller 6 uses the relay servers M1, M2 as the relay server for the transfer of content α. By using all of relay servers involved on the path in this way, the network resource consumption at one time becomes small, resulting in reduced influence on other traffics.

However, as the number of relay servers increases, the time required for transfer of the content to its destination become longer. Accordingly, the number of relay servers is preferably variable depending on the degree of urgency of transferred content. For example, there can be considered such a way that in the case where the urgency of content is determined based on the updating frequency of content or the like, the content with high urgency is relayed via small number of servers, and while content with low urgency is relayed via large number of servers.

Thereafter, the relay controller 6 transmits the ID of content α to be obtained and the address of the Web server S1 to the relay server M2 which is located most upstream among the relay servers M1, M2 determined to be used in step F42 (step F44).

In the present embodiment, when no relay server exists on the path between the relay control cache server C1 and the Web server 31 and therefore a relay server to be used cannot be determined in step F42, the relay controller 6 requires the transfer of the content α from Web server S1 originally storing the content α.

Alternatively, the following way can be also adapted. The number of relay servers is determined to be equal to or lower than a certain number (N) which is determined depending on the degree of urgency of content to be transferred. First, N relay servers are selected so that the total number of passing links is minimized. When such N relay servers can be obtained, these N relay servers are used to transfer the content. If such N relay servers cannot be obtained, the N is decremented by one and N−1 relay servers are selected so that the total number of passing links is minimized. Such a procedure is repeated until relay servers to be used have been obtained. When no relay server to be used is selected even when N=1, the content is transferred without using any relay server. In other words, the transfer of the content is requested from the server originally storing the content.

Figure 5:
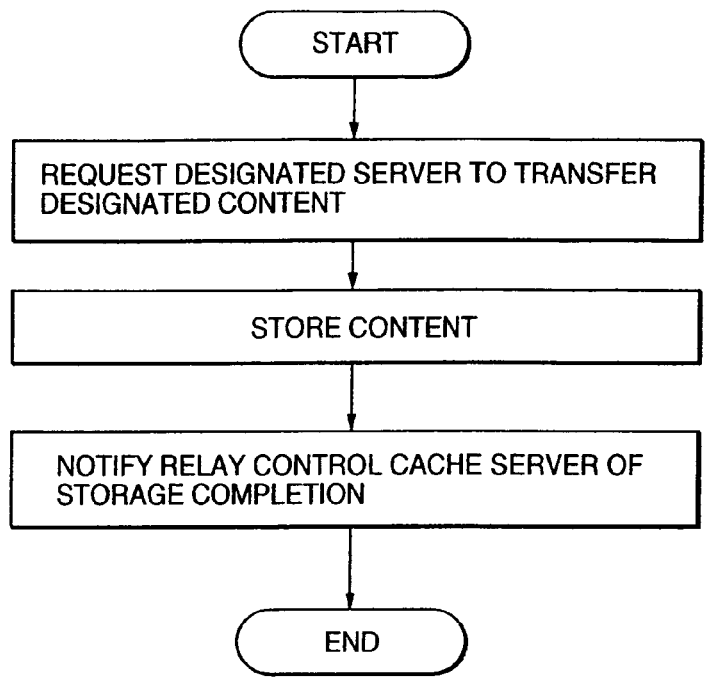
FIG. 5 is a flow chart showing a storing control operation of the relay server.
Figure 6:
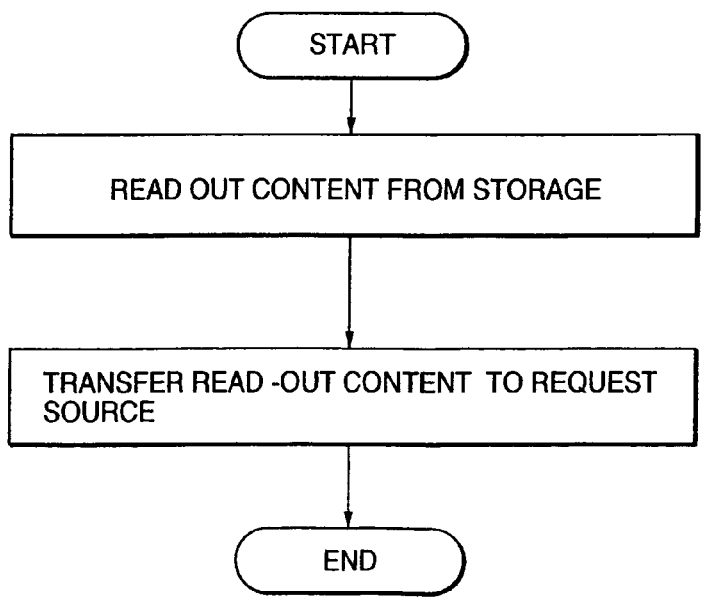
FIG. 6 is a flow chart showing a reading control operation of the relay server.

Referring to FIG. 5, the controller 12 of the relay server M2, when receiving the ID of content, α and the network address of the Web server S1, requests the transfer of the content α from the Web server S1 (step F51). Accordingly, the content α is transferred from the Web server S1 to the relay server M2 via the path: S1→R1→L1→R2→L2→R3→M2.

When the content α has been received from the Web server S1, the controller 12 of the relay server M2 stores it into the storage 12 (step F52), and thereafter notifies the relay control cache server C1 which is the request source of storage completion (step F53).

Returning to FIG. 4, when the relay controller 6 of the relay control cache server C1 is notified of the storing completion of content α from the relay server M2, the relay controller 6 checks whether available or unused servers are included in the relay servers determined in step F42 (step F43). If available servers are included (YES at step F43), then the content α to be obtained and the location thereof are sent to the relay server located most upstream among the available servers (step F44). If no server is available (NO at step F43), the process of step F45 is performed. In the case of this example, since the relay server M1 is available, the relay controller 6 instructs the relay server M1 to receive the ID of the content α and the address of the relay server M2 (step F44).

The controller 12 of the relay server M1 having received this instruction requests the transfer of content α from the relay server M2 (step F51 of FIG. 5). Accordingly, the controller 12 of the relay server M2 reads out the content α from the storage 13 of its own (step F61 of FIG. 6), and the content α is transferred to the relay server M1 which is the request source via the path of M2→R3→L3→R4→L4→R5→M1 (step F62 of FIG. 6).

When the content α has been received from the relay server M2, the controller 12 of the relay server M1 stores the received content α to the storage 13 of its own (step F52 of FIG. 5) and thereafter notifies the relay control cache server C1 of the storage completion of the content α (step S53 of FIG. 5).

When receiving this notification, the relay controller 6 of the relay control cache server C1 checks whether any available relay server is included in the relay servers M1, M2 determined at step F42 (step F43 of FIG. 4). In the case of this example, since both of relay servers M1 and M2 have been already used, it is determined that no relay server is available (NO at step F43), and therefore the step F45 is performed.

In the step F45, the relay control cache server C1 requests the transfer of the content α to the relay controller cache server C1 from the relay server M1 located most downstream among the relay servers M1 and M2 determined at the step F42. As shown in FIG. 6, the controller 12 of the relay server M1 having received this requirement leads out the content α from the storage 13 of its own (step F61), and transfers it to the relay control cache server C1 through the path: M1→R5→L5→R6→C1 (step F62).

When the content α has been received from the relay server M1, the automatic cache updating section 4 of the relay control cache server C1 obtains the content α and stores it into the storage 8 (F46).

Second Embodiment

Figure 8:
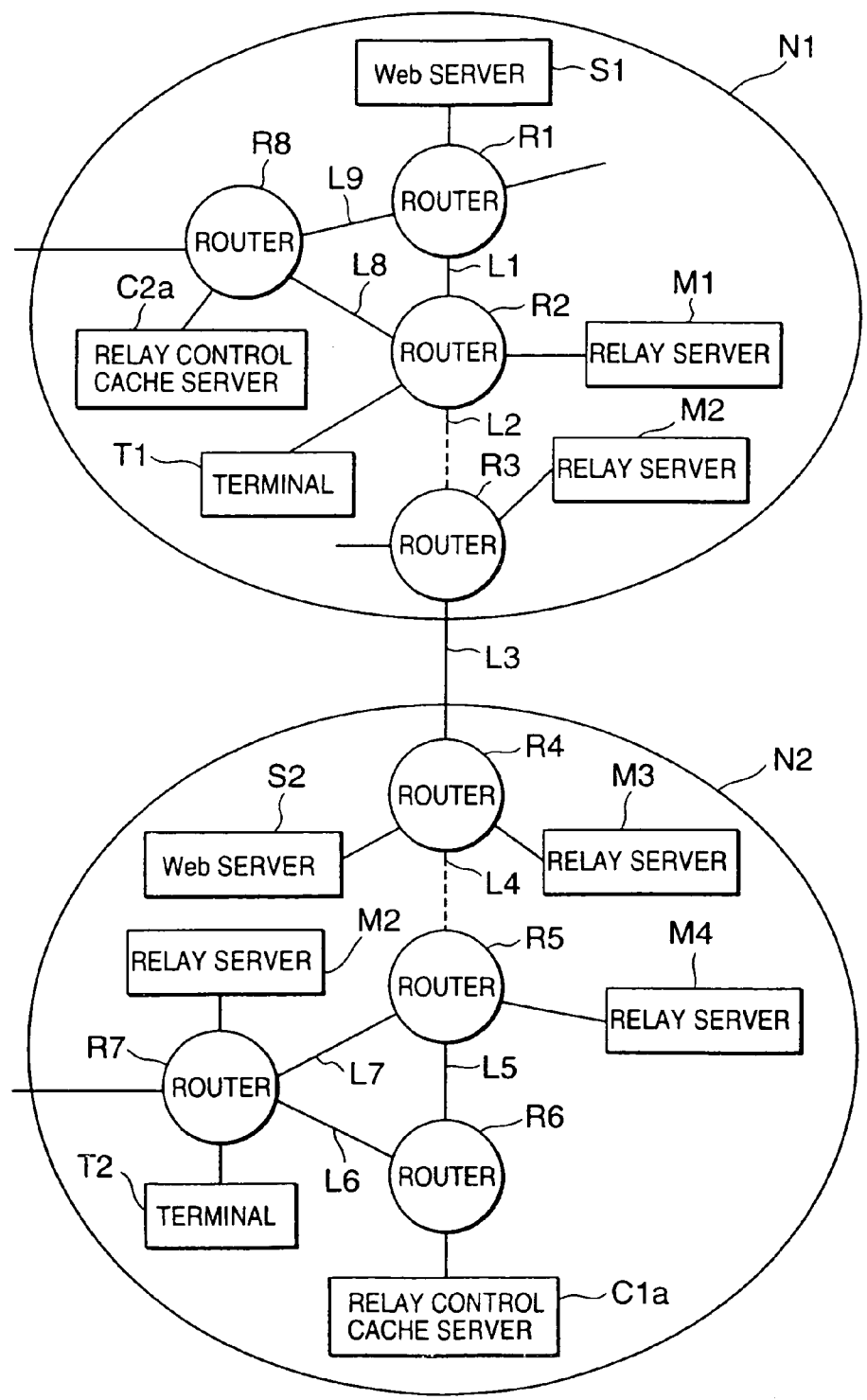
FIG. 8 is a diagram showing a part of a network system according to a second embodiment of the present invention.

As shown in FIG. 8, it is assumed for simplicity that a first area N1 includes Web server 31, relay control cache server C2a, terminal T1, relay servers M1, M2 and routers R1 to R3 and R8, and further that a second area N2 includes Web server S2, relay control cache server C1a, terminal T2, relay servers M3 to M5, routers R4 to R7, where there is a time difference between the first and second areas N1 and N2. The routers R1 to R8 are connected by links L1 to L9 as shown in FIG. 8.

Figure 9:
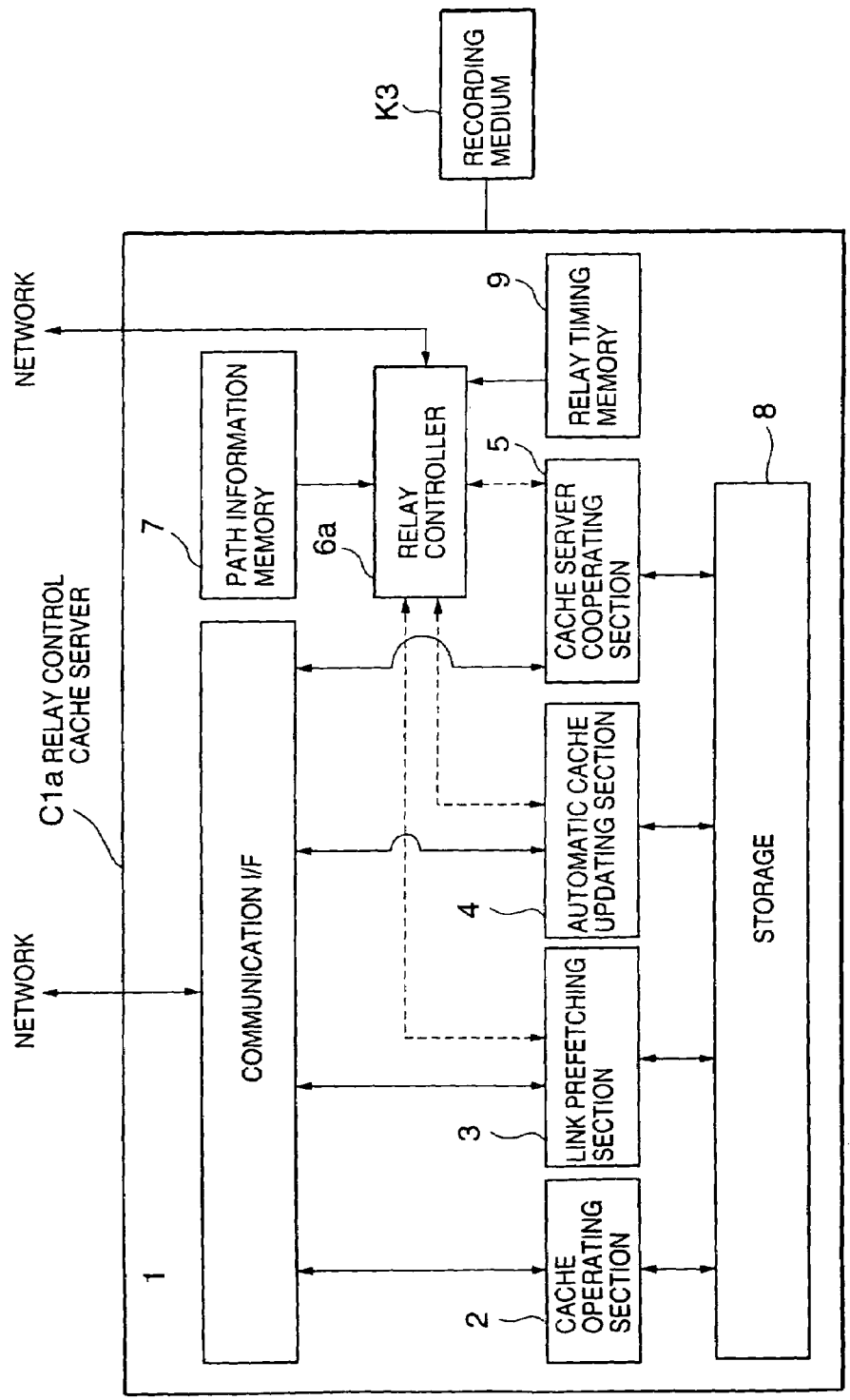
FIG. 9 is a block diagram showing an internal circuit of a relay control cache server in the second embodiment.

Referring to FIG. 9, the relay control cache server C1a is different from the relay control cache server C1 as shown in FIG. 2 in that a relay timing memory 9 is added, the relay controller 6 is replaced with a relay controller 6a, and the recording medium K1 is replaced with a recording medium K3. The other relay control cache server C2a has the same circuit configuration as that of C1a.

In the relay timing memory 9, time slots suitable for relay operation are stored in respective ones of the relay servers M1 to M5. The time slot stored in each of the relay servers M1 to M5 is determined so that small traffic is predicted in the area where a corresponding relay server is installed.

The relay controller 6a has the above-described functions of the relay controller 6 and further an additional function such that, when the relay controller 6a instructs a relay server M1 (1≦i≦5) to relay content or the like, the relay controller 6a searches the relay timing memory 9 for a time slot corresponding to the relay server M1 and issues the relay instruction to the relay server M1 for the found time slot.

The recording medium K3 like a disk or a semiconductor memory stores a program for making the computer function as the relay control cache server C1a. This program runs on the computer to control the operation of the computer, and thereby the communication interface section 1, the cache operating section 2, the link prefetching control section 3, the automatic cache updating section 4, the cache server cooperating section 5, and the relay controller 6a are realized on the computer.

Operation

Operations of the second embodiment will be described in detail taking as an example the case where the automatic cache updating section 4 of the relay control cache server C1a located in the second area N2 obtains content α from the Web server S1 located in the first area N1.

Figure 10:
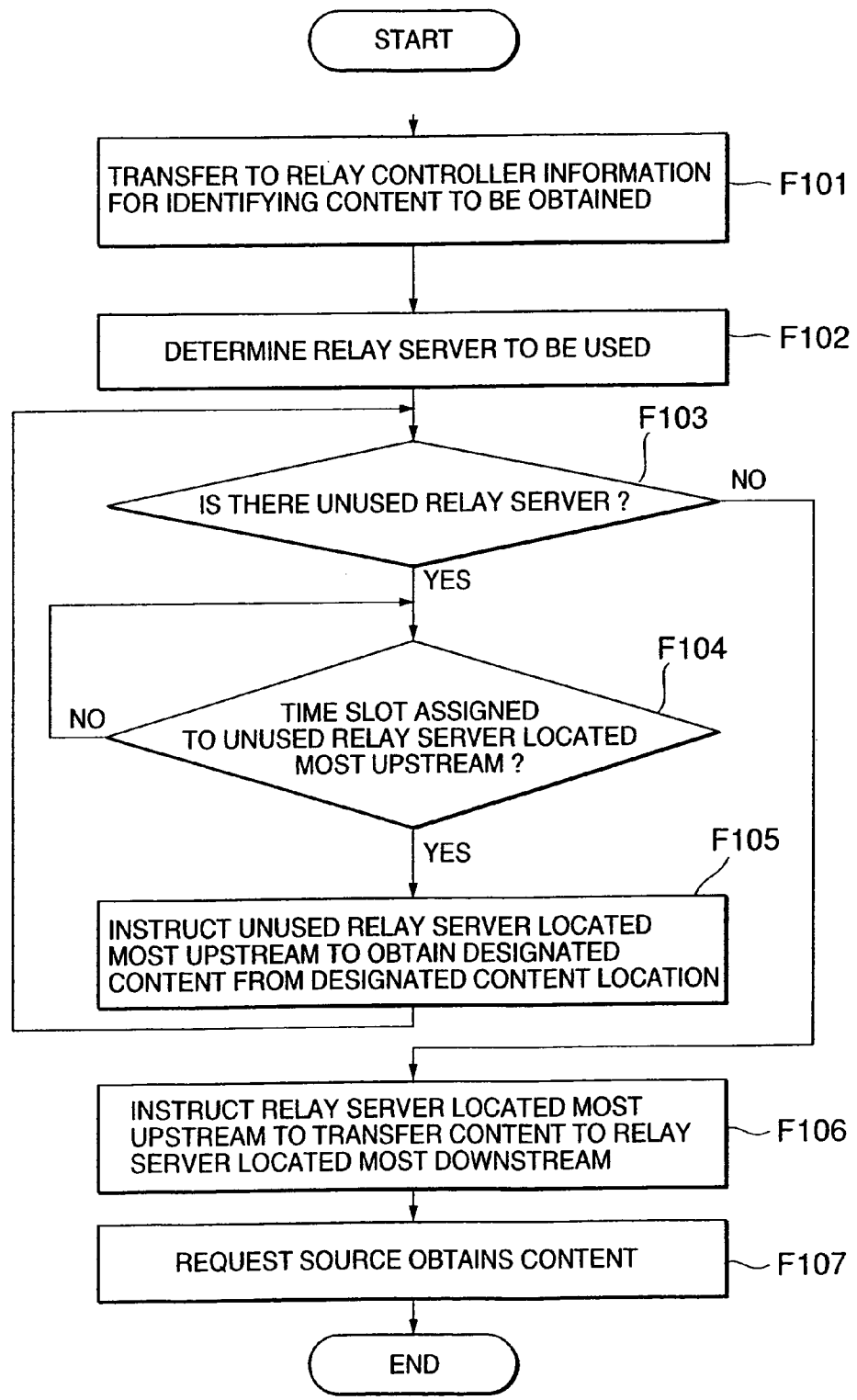
FIG. 10 is a flow chart showing a control operation of the relay control cache server of the second embodiment.
Figure 11:
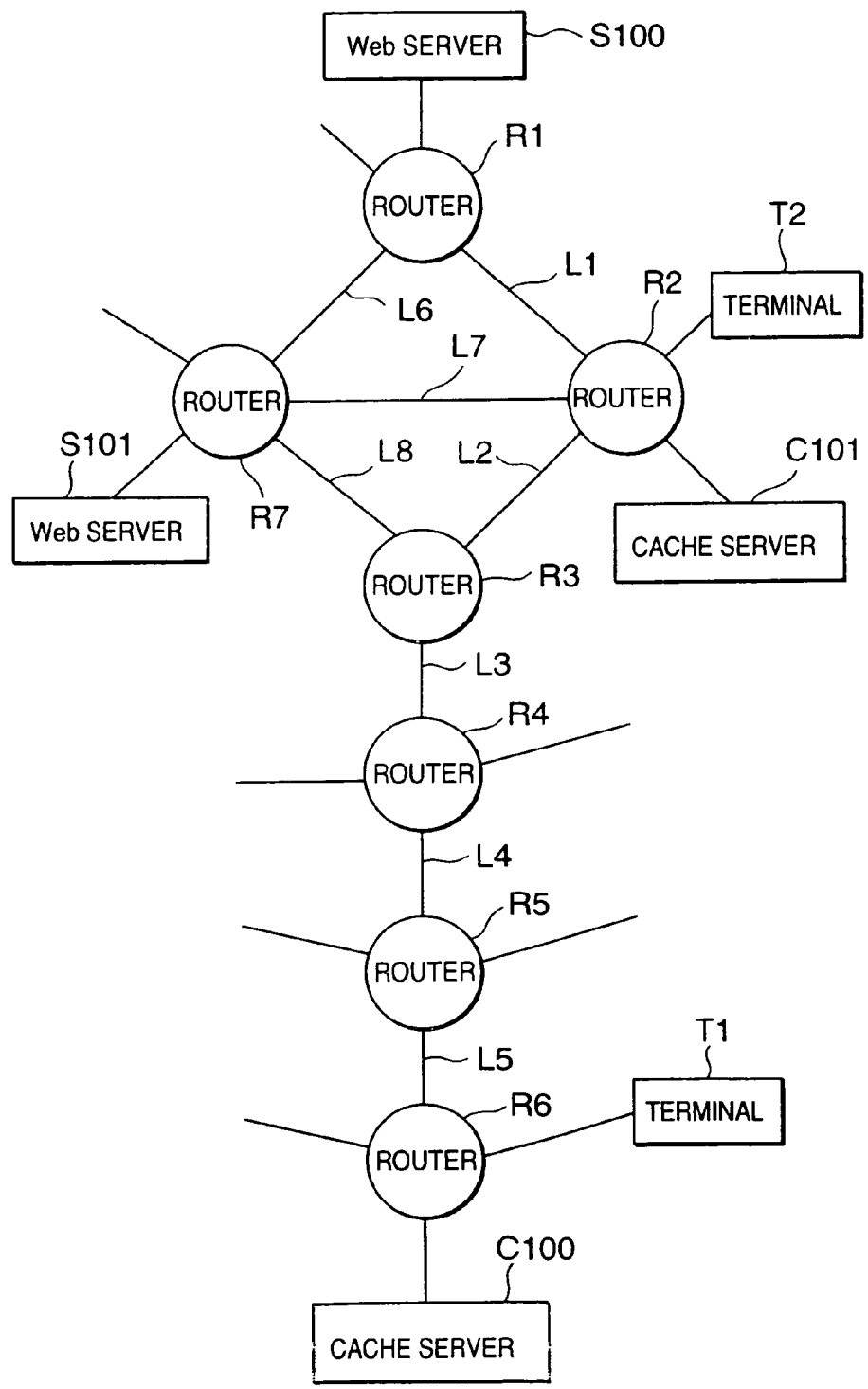
FIG. 11 is a diagram showing a part of a conventional network system.

Referring to FIG. 10, when the automatic cache updating section 4 of the relay control cache server C1a obtains content α held in the Web server S1, the automatic cache updating section 4 transfers ID information for specifying the content α and the network address of the Web server S1 to the relay controller 6a (step F101). The relay controller 6s determines a relay server used for transfer of the content α based on the network address of Web server S1, network addresses of respective ones of the previously recognized relay servers M1–M5, and the path information stored in the path information memory 7 (step F102).

In the step F102 similar to the step F42 of FIG. 4, all of relay servers involved in the path between the relay control cache server C1a and the Web server S1 are used for the transfer of the content α. For example, when the path between the relay control cache server C1a and the Web server S2 is assumed as: S1→R1→L1→R2→L2→R3→L3→R4→L4→R5→L5→R6→C1a, the relay controller 6a uses the relay servers M1–M4 for the transfer of the content α.

Thereafter, the relay controller 6a searches the relay timing memory 9 for the time slot corresponding to the relay server M1 which is located most upstream among the relay servers M1–M4 determined to be used in step F102. When the current time falls into the time slot corresponding to the relay server M1 (YES at step F104), the relay controller 6a notifies the relay server M1 of the information of ID of the content α and the Web server S1 (step F105). When the current time falls out of the time slot corresponding to the relay server M1 (NO at step F104), the relay controller 6a waits for the current time to reach the time slot before notifying the relay server M1 of the information of ID of the content α and the Web server S1. If no relay server exists on the path between the relay control cache server C1a and the Web server S1 and therefore a relay server to be used cannot be determined in step F102, then the relay controller 6a requires the transfer of the content α from the Web server S1 originally storing the content α.

The controller 12 of the relay server M1 (see FIG. 3), when receiving the ID of content α and the network address of the Web server S1, requests the transfer of the content, α from the Web server S1 (step F51 of FIG. 5). Accordingly, the content α is transferred from the Web server S1 to the relay server M1 via the path: S1→R1→L1→R2→M1.

When the content, α has been received from the Web server S1, the controller 12 of the relay server M1 stores it into the storage 13 (step F52 of FIG. 5), and thereafter notifies the relay control cache server C1a as the request source of storage completion (step F53 of FIG. 5).

Returning to FIG. 10, when the relay controller 6a of the relay control cache server C1a is notified of the storing completion at content α from the relay server M21, the relay controller 6a checks whether available or unused servers are included in the relay servers determined in step F102 (step F103). In the case of this example, since the relay servers M2–M4 are available, the relay controller 6a determines whether the current time falls into the time slot corresponding to the relay server which is located most upstream among the relay servers M2–M4 determined to be used in step F102 (step F104).

In this example, since the relay saver M2 is located most upstream, the relay controller 6a searches the relay timing memory 9 for the time slot corresponding to the relay server M2. When the current time falls into the time slot corresponding to the relay server M2 (YES at step FIG. 4), the relay controller 6a notifies the relay server M2 of the ID of the content α and the Web server 51 (step F105). When the current time falls out of the time slot corresponding to the relay server M2 (NO at step F104), the relay controller 6a waits for the current time to reach the time slot before performing the step F105.

The above operation is repeatedly performed to relay the content α through the relay servers M1, M2 and M3 to the relay server M4. When the content α has been received, the controller 12 of the relay server M1 stores the received content α to the storage 13 of its own (step F52 of FIG. 5) and thereafter notifies the relay control cache server C1a of the storage completion of the content α (step F53 of FIG. 5).

When receiving this notification, the relay controller 6a of the relay control cache server C1a checks whether any available relay server is limited in the relay servers M1, M2 determined at step F102 (step F102 of FIG. 10). In the case of this example, it is determined that no relay server is available (NO at step F103), and therefore the step F106 is performed.

In the step F105, the relay controller 6a of the relay control cache server C1a requests the transfer of the content α to the relay control cache server C1a from the relay server M4 located most downstream among the relay servers M1–M4 determined at the step F102 (step F106). As shown in FIG. 6, the controller 12 of the relay server M4 having received this request reads out the content α from the storage 13 of its own (step F61), and transfers it to the relay control cache server C1a through the path: M4→R5→L5→R6→C1a (step F62).

When the contents α has been received from the relay server M4, the automatic cache updating section 4 of the relay control cache server C1a obtains and stores it into the storage 8 (step F107).

In the above-described first and second embodiments, the relay control cache server determines the relay timing and instructs the relay server. It is also possible to employ such a design that each relay server determines the relay timing and performs the relay. In this design, for example, the following methods (a) and (b) are adaptable.

(a) A monitor packet is continually transmitted to an adjacent relay server to measure a delay time. Based on the measured delay time, a time slot having a relatively short delay time is determined. When relaying content to a downstream relay server, it is determined whether the current time falls into the determined time slot. When the current time falls into the determined time slot, the transfer of the content to the downstream relay server is performed.

(b) A monitor packet is continually transmitted to an adjacent relay server to measure an average delay time and its variation. When relaying content to a downstream relay server, a measuring packet is transmitted to a downstream relay server to measure a current delay time. Based on a deviation of the measured current delay time from the average delay time, it is determined how much traffic occurs at the downstream relay server. If heavy traffic does not occur, the relay is performed. If heavy traffic occurs, the traffic measurement procedure is repeated after a while to determine whether heavy traffic disappears.

As described above, according to the present invention, at least one relay server is used to transfer content nor requiring urgency from a content storing server to a content-request source. Accordingly, it is possible to transfer the content for each of sections obtained by at least one relay server dividing the path from the content storing server to the content-request source. Compared with the prior art such that the transfer of content simultaneously occupies a certain bandwidth in the entire path, the network resource consumption at one time becomes small, resulting in reduced influence on other traffics.

Further, since relay servers perform the relay operation during the time slots determined for respective ones of the relay servers (for example, a time slot in which small traffic is estimated in the area where a corresponding relay server is installed), the influence on other traffics can be reduced furthermore.

The invention claimed is:

1. A method for transferring information that is not urgent from a server originally holding the information to an information-request source through a network including a plurality of routers, comprising the steps of:
determining a number (N) of relay servers based on a degree of urgency of the information;
determining at least one relay server adjacent to one of the routers located on a path between the server and the information-request source, wherein the path is set by at least one router in the network;
relaying the information via a number of relay servers not greater than N;
transferring the information through the path such that each relay server receives the information from upstream, temporarily stores and transmits the same to downstream wherein the relay server does not comprise a portion of the direct path between the server and the information-request source.

2. The method according to claim 1, wherein the information-request source is a cache server for storing a copy of information that is likely to be accessed by a terminal.

3. The method according to claim 2, wherein transfer of information from the server to the cache server is caused by the cache server performing at least one of an automatic cache updating operation, a link prefetching operation and a cache server cooperating operation.

4. A method for transferring information that is likely to be accessed by a terminal from a server originally holding the information to a cache server through a network including a plurality of routers, wherein the information is stored in the cache server, comprising the steps of:
providing a plurality of relay servers each being adjacent to the router and having a time slot previously assigned thereto;
determining a number (N) of relay servers based on a degree of urgency of the information:
relaying the information via a number of servers not greater than N;
determining at least one relay server located on a path between the server and the cache server, wherein the path is set by at least one router in the network;
at each relay server,
when a current time falls into the time slot assigned thereto, sending a request for transfer of the information to an upstream-located server holding the information;
when receiving the information from the upstream-located server through the path in response to the request, storing the information; and
when receiving a request for transfer of the information from a downstream-located server, transmitting the information stored to the downstream located server through the path.

5. The method according to claim 4, wherein the time slot assigned to each relay server is determined depending on where the relay server is installed, wherein the time slot is a time period during which small traffic is predicted in an area where the relay server is installed.

6. A network system comprising:
a content-request source for requesting content that is not urgent;
a server storing the content;
a plurality of routers,
at least one relay server for relaying the content adjacent to one of the routers; and
wherein
the content-request source comprises:
a relay controller for notifying a relay server located on a path set by at least one router between the server and the content-request source, of identification of the content to be obtained wherein the path includes at least a number (N) of relay servers based on an urgency of content and, the at least one relay server comprises:
a storage for storing the content;
and a controller controlling such that the content is received from upstream, is temporarily stored in the storage, and is transmitted to downstream via a number of relay servers not greater than N, wherein the relay server does not comprise a portion of the direct path between the server and the information-request source.

7. The network system according to claim 6, wherein the content-request source is a cache server for requesting content that is likely to be accessed by a terminal, wherein when requesting a latest version of the content that is likely to be accessed by a terminal, the relay controller notifies the relay server located on the path of the identification of the content.

8. The network system according to claim 7, wherein the cache server comprises:
at least one of an automatic cache updating section, a link prefetching section and a cache server cooperating section, which request the relay controller to obtain the latest version of the content that is likely to be accessed by a terminal.

9. A network system comprising:
a cache server for requesting content that is likely to be accessed by a terminal;
a server storing the content;
a plurality of routers,
a plurality of relay servers, each of which is adjacent to a router that relays the content; and
wherein
the cache server comprises: a relay timing memory for storing a time slot suitable for relay operation for each of the relay servers;

and a relay controller for notifying a relay server located on a path set by at least one router between the server and the cache server, of identification of the content to be obtained, in the time slot for the relay server wherein the path includes at least a number (N) of relay servers based on an urgency of content;

and each of the relay servers comprises:

a storage for storing the content; and a controller controlling such that when receiving the identification of the content to be obtained from the cache server, a request for transfer of the content is sent to an upstream-located server holding the content, when receiving the content from the upstream-located server through the path in response to the request, the content is stored in the storage, and when receiving a request for transfer of the content from a downstream-located server, the content stored is transmitted to the downstream-located server through the path via a number of relay servers not greater than N, wherein the relay server does not comprise a portion of the direct path between the server and the information-request source.

10. The network system according to claim 9, wherein the time slot for each of the relay servers is determined depending on where the relay server is installed, wherein the time slot is a time period during which small traffic is predicted in an area where the relay server is installed.

11. A recording medium storing a first program for instructing a content-request computer to request content that is not urgent from a server computer storing the content through a network and a second program for instructing a relay server computer to relay the content, in machine-readable form, the first program comprising the steps of:

making the content-request computer function as a relay controller for determining a number (N) of relay servers based on a degree of urgency of the information and relaying the information via a number of servers not greater than N;

notifying a relay server located adjacent to a router on a path set by at least one router between the server computer and the content-request computer, of identification of the content to be obtained, wherein the relay server does not comprise a portion of the path between the server and the information-request source and a monitor packet is transmitted to the relay server to determine a delay time; and the second program comprising the steps of:

making the relay server computer function as a controller controlling such that the content is received from upstream, is temporarily stored in a storage, and is transmitted to downstream.

12. The recording medium according to claim 11, wherein the content-request computer is a cache server computer for requesting content that is likely to be accessed by a terminal, wherein when requesting a latest version of the content that is likely to be accessed by a terminal, the relay controller notifies the relay server computer located on the path of the identification of the content.

13. A recording medium storing a first program for instructing a cache server computer to request content that is likely to be accessed by a terminal from a server computer originally storing the content and a second program for instructing a relay server computer to relay the content, in machine-readable form, the first program comprising the steps of:

storing time slots previously assigned to respective ones of a plurality of relay server computers in a network; and determining a number (N) of relay servers based on a degree of urgency of the information and relaying the information via a number of servers not greater than N;

determining at least one relay server computer adjacent to a router located on a path between the server computer and the cache server computer, wherein the path is set by at least one router in the network, wherein the relay server does not comprise a portion of the direct path between the server and the information-request source, and the second program comprising the steps of:

when a current time falls into the time slot assigned thereto, sending a request for transfer of the content to an upstream-located server computer holding the content;

when receiving the content from the upstream-located server through the path in response to the request, storing the content in a storage; and when receiving a request for transfer of the content from a downstream-located server, transmitting the content stored to the downstream located server through the path.

* * * * *